United States Patent [19]
Strubbe

[11] 3,722,193
[45] Mar. 27, 1973

[54] AUTOMATIC HEADER HEIGHT CONTROLLING MECHANISM

[75] Inventor: Gilbert J. Strubbe, Zedelgem, Belgium

[73] Assignee: Clayson N.V., Zedelgem, Belgium

[22] Filed: Oct. 21, 1971

[21] Appl. No.: 191,282

[52] U.S. Cl. ................................................56/208
[51] Int. Cl. ............................................A01d 67/00
[58] Field of Search ................................56/208–217

[56] References Cited

UNITED STATES PATENTS

| | | | |
|---|---|---|---|
| 2,700,265 | 1/1955 | Spieth | 56/16.3 |
| 2,971,316 | 2/1961 | Popandopulo | 56/208 |
| 3,402,540 | 9/1968 | Karlsson et al. | 56/208 |
| 3,568,420 | 3/1971 | Hofer et al. | 56/208 |
| 3,603,066 | 9/1971 | Burrough et al. | 56/208 |
| 3,623,301 | 11/1971 | Hofer | 56/208 |

Primary Examiner—Russell R. Kinsey
Attorney—Joseph A. Brown

[57] ABSTRACT

An automatic header height controlling mechanism for agricultural machines, more especially harvesters of the type having a header with a cutting mechanism for harvesting crops, whereby said automatic header height controlling mechanism comprises electrical position indicators which may be actuated by ground sensing members coupled to the side edges of the header and extending far in front of the header, in combination therewith a series of feeler elements provided rearwardly of and inbetween said ground sensing members, a header lifting rams controlling mechanism controlling the oil supply to and discharge from said rams and an electric servo circuit actuating said rams controlling mechanism, coupling said rams controlling mechanism to the electrical position indicators for forming a positioning circuit for generally positioning the header at a desired level above the ground on the one hand, and to the feeler elements for on contact thereof with an obstruction located inbetween the ground sensing members to raise the header, independant from the header positioning circuit on the other hand.

25 Claims, 10 Drawing Figures

AUTOMATIC HEADER HEIGHT CONTROLLING MECHANISM

BACKGROUND OF THE INVENTION

1. Field of the Invention

The invention relates to the field of agricultural machines such as combine harvesters, having a header for harvesting the standing crops on the field and for conveying these crops to crop treating means such as e.g. the threshing components.

The invention relates more particularly to an automatic height control system for such headers.

As generally known in the art of such harvesting machines, more particularly combine harvesters, such headers comprise a generally trough shaped framework supporting at its front end a crop cutting mechanism, further supporting generally above said crop cutting mechanism a rotatable reel and in the header trough a rotatable header auger All the foregoing elements enable the device to cut the standing crops and to convey these cut crops to the crop handling devices.

Under some conditions the header is moving relatively high above the ground during harvesting, e.g., when only the ears of the standing crops have to be harvested.

In other conditions, the header has to be kept in close relationship to the ground in order to obtain an appropriate harvesting. The latter is, e.g., particularly true when laid on down crops or crops with short stems such as soya beans have to be harvested.

The invention relates to an automatic header height controlling mechanism, which is particularly adapted for application on the header operating under the latter conditions.

2. Description of the Prior Art

It has been known in the art to provide an automatic header height controlling mechanism having sliding shoes provided underneath the header through which, during the forward movement of the harvester in the field, senses the surface of the terrain. The displacement of these sliding shoes is transferred through a mechanical or hydraulical converting mechanism to a hydraulic adjusting valve which controls the oil supply to, respectively discharge from the header lifting rams, by which the header height is thus adjustable.

Due to the positioning of the movable sliding shoes behind the cutter bar on the one hand, and due to the heavy inertia mass of the header on the other hand which prevents any immediate and complete reaction upon each adjusting signal, the header height corrections are often obtained too late. Moreover, also the header lifting mechanism itself has a certain retardation in response to any height adjusting signal. Due to the foregoing imperfections the header trough often hits the ground by which under influence of the great pressure of the header on the ground, earth is pushed forwards and finally the cutting mechanism lands in the ground. As a result thereof earth is conveyed together with the harvested crops, whereby these crops are soiled on the one hand and either parts blocking or break-downs may occur on the other hand.

Further, as the foregoing disadvantages are the result of the mounting of the movable slide shoes, behind the cutting mechanism, it has also been known to provide header height controlling mechanisms comprising sensing means mounted to the crop dividers, in other words, in front of and at the side edges of the aforesaid cutting mechanism. The controlling signals are transmitting to the header lifting rams through similar converting means.

Due to the fact that the ground is sensed at no other place than the side edges of the header, and the headers are relatively large, such mechanisms also fail to be efficient, since ground unevennesses situated inbetween both crop dividers are not sensed, so that also, with this execution the cutting mechanism may interfere with the ground when operating on rough fields.

Further, it has also been known to provide crop lifters just in front of the cutting mechanism which may sense the ground and transmit header height adjusting signals to the header lifting mechanism. Also with this header height adjusting mechanism it may happen that the cutting mechanism lands in the ground, since for being effective, the sensing should take place far in front of the cutting mechanism, which is not so with the aforesaid crop lifters.

In general the automatic header height controlling mechanisms known in the art have all proven to have one or more imperfections.

SUMMARY OF THE INVENTION

The present invention aims at an automatic header height controlling mechanism which excludes systematically the aforesaid and other disadvantages of the mechanisms known in the art.

The automatic header height controlling mechanism for agricultural machines, more especially harvesters of the type having a header with a cutting mechanism for harvesting crops mainly comprises for this purpose, electrical position indicators which may be actuated by ground sensing members coupled to the side edges of the header and extending far in front of the header, in combination therewith a series of feeler elements provided rearwardly of and inbetween said ground sensing members, a header lifting rams controlling mechanism controlling the oil supply to and discharge from said rams and an electric servo circuit actuating said rams controlling mechanism, coupling said rams controlling mechanism to the electrical position indicators for forming a positioning circuit for generally positioning the header at a desired level above the ground on the one hand and to the feeler elements for on contact thereof with an obstruction located inbetween the ground sensing members to raise the header, independent from the header positioning circuit on the other hand.

In one preferred embodiment the electrical position indicators are coupled to the right and left hand crop dividers, while the feeler elements are formed by crop lifter shaped pivotable structures, which on contact thereof with an obstruction actuate an electric contact. These crop lifter shaped structures are thus mounted in front of the cutting mechanism. The electric servo circuit is an electronic circuit which influences the header ram controlling mechanism all the time as such that it tries to bring the position of the aforesaid position indicators in accordance with an adjustable third position indicator which is provided in this circuit.

With electrical position indicator, a mechano-electrical transducer which generates an electrical signal of which at least one characteristic variates in accordance with the variations of the height of the header above the ground, is meant.

In this way, the larger ground unevennesses are sensed by means of sensor means formed by the crop dividers, whereas smaller obstacles such as short ground unevennesses, large stones and the like are detected by means of the feeler elements formed by the crop lifter shaped structures provided in front of the cutter bar inbetween the crop dividers.

Both sensing systems are coupled to each other in such a manner that the signal asking a raising of the header gets priority to any other signal.

In a preferred embodiment the mechanism will be realized in such a manner that the signals originated in the position indicators, being coupled to the crop dividers may cause the header to be raised, respectively lowered, whereas the signals originated in the feeler elements may only cause an upward movement of the header. The signals of the feeler elements have priority to the signals of the position indicators requiring a downwards correction.

Also the position indicators coupled to both crop dividers are electrically interconnected in such a manner that a signal of one indicator requiring a raising, overrides an eventual signal of the other indicator requiring a downwards movement of the header.

According to another characteristic of the invention a throttling circuit is provided in the hydraulic system of the header lifting mechanism for preventing any too sudden changes in the movement of the header whereby otherwise the automatic header height control system would become unstable.

Therefore a so-called throttle valve is provided in the hydraulic header lifting circuit, of which the position is controlled by a separate electric or electronic circuit.

Without the foregoing provision the automatic header height control would become unstable as, e.g., at the end of a lowering movement the oil discharge from the lifting rams would be stopped too suddenly, which would result in still a further lowering of the header over a short distance, due to the great inertia mass of the header and due to the elasticity of the structure (elasticity of hydraulic system, eventual momentanous deformations of components, tipping movement of the combine around the front wheelshaft, deformation of the tires etc..) and whereby the lowering movement would not have come to an end, before the sensing members would again require a raising, etc..

Such oversteering is prevented by the aforesaid throttle-valve which throttles the oil discharge from and eventually also the supply to the header lifting rams at the end of a correction movement of the header.

In an alternative preferred embodiment the position indicators are formed by two contacts, one of which upon actuation enduces a raising signal, while the other upon actuation enduces a lowering signal. The electric servo circuit comprises a relais giving priority to any raising signal with respect to any other signal.

The automatic header height control is obtained by mechanical sensing elements and electric circuits having a very simple structure. The control mechanism is very simple and compact. In this way, a very sensitive device, with a minimum of retardation and nevertheless a great stability is obtained, which enables an easy adjustment of the stubble height without major manual interference.

Other advantages of the present invention are, e.g.;

practially the entire width of the header is sensed so that the header height is adjusted as well with respect to small obstacles as to large ground unevennesses.

The cutting height is conveniently adjustable.

Electric circuits with a great durability are used.

In an alternative preferred embodiment wherein electronic components are used these components may be provided in a black box.

The electronic circuit comprises an amplifier by which a great precision is obtained.

The posibility for manual intervention is maintained.

The contact pressure required, between sensing means and the ground, respectively obstructions, is very small, so that a very great sensitiveness is obtained.

As the positioning circuit gets its signal from ground sensing members positioned far in front of the cutting mechanism, any height adjustment with respect to major ground unevennesses is completed before the cutting mechanism reaches said unevennesses.

The header really moves over the obstacles so that there is no earth accumulation in front of the header.

The feeler members detect any obstacle large enough to otherwise spoil the grain and eventually damage components of the header, so that a perfect protection for the cutting mechanism is obtained.

The mechanism is powered by the battery of the machine by which it is very simple and cheap.

No special designed additional hydraulic parts are needed.

A great comfort for the combine driver is obtained since he has no longer to continuously check and adjust the header height by which the fatigue factor is considerably reduced, and by which indirectly, the day output of a combine is increased.

In general a perfectly safe automatic header height control mechanism is obtained, whereby it becomes possible to make the header float over any obstacle.

Other objects and advantages will appear from the following description of an example of the invention, when considered in connection with the accompanying drawings, and the novel features will be particularly pointed out in the appended claims.

Figure 1:
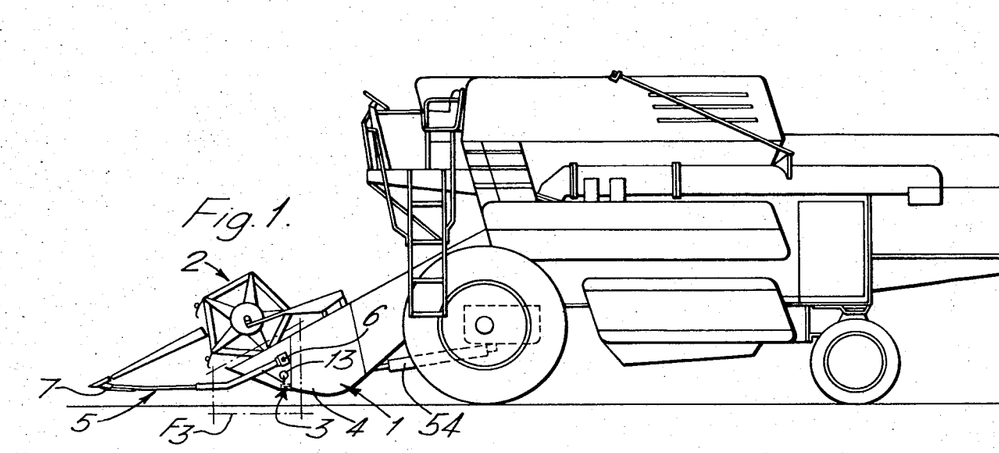
FIG. 1 is a schematical side view of a combine on which the improvements are applied according to the invention.
Figure 2:
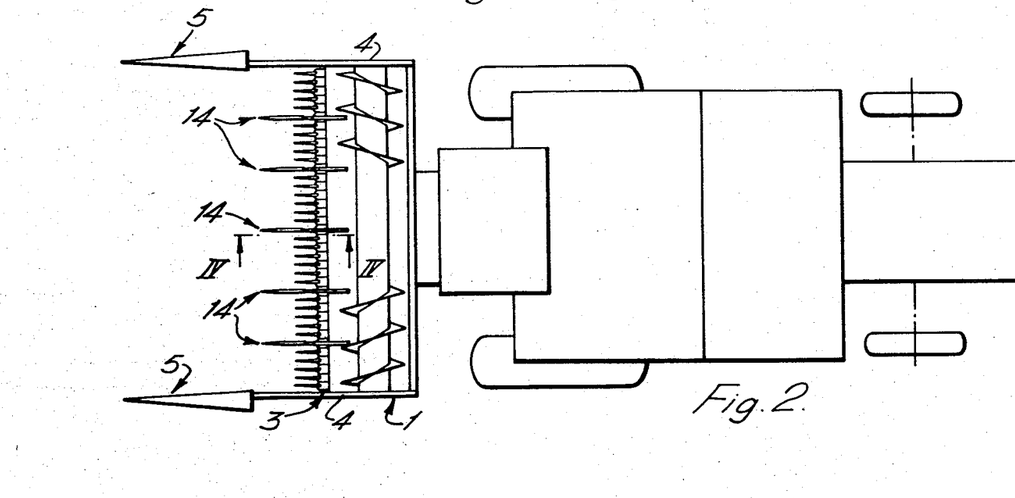
FIG. 2 is a schematical top view of the combine shown in FIG. 1.

As known a combine is always provided with a header 1 having a reel 2 and at its front side a cutting mechanism 3, for harvesting the standing crops.

Such a header mainly comprises a trough shaped frame with vertical side walls 4 to which the so called crop dividers 5, one at each side of the header 1, are generally freely pivotably mounted at pivot points 6. These crop dividers extend in front of the header trough and slide over the ground via a plate 7 during the operation of the combine. They serve to guide the laid on down crop stalks which have fallen outside the edge of the standing crops in such a manner that they completely land in the header. These crop dividers also serve to divide the crop strip which is to be harvested from the remaining crops.

Since these crop dividers 5 can pivote around their pivot point 6, they can sense the ground at any moment, so that the angular displacement of the crop dividers 5 during harvesting can be used as an input signal for adjusting the header height with respect to the ground.

Figure 3:
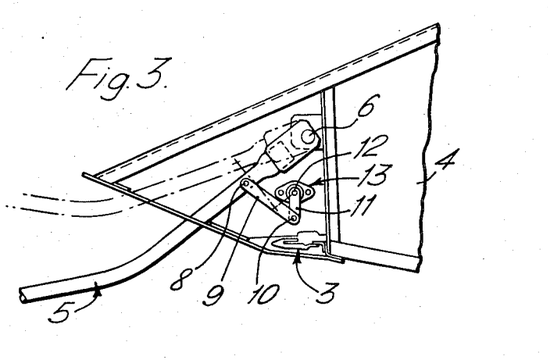
FIG. 3 shows on a larger scale the part that is indicated in FIG. 1 by F3.

In this preferred embodiment, each crop divider 5 is hinged via a spindle 8 on a rod 9 which has a further end portion hinged via a spindle 10 on a lever or arm 11 which has a further end portion that is fixed to the shaft 12 of a position indicator 13. Such a position indicator 13 will preferably be releasably attached to the respective header side wall 4 so as to enable a specific setting. Such a position indicator is preferably formed by a potentiometer.

The crop dividers 5 pivoted to the side walls 4 of the header 1 sense the ground in front of said side walls during operation. Each position of such a crop divider and thus each unevenness of the ground at the location of the crop divider corresponds to another setting of the respective potentiometer 13.

In order to sense the smaller ground unevennesses, large stones and the like, situated between both crop dividers, and being large enough to eventually damage the header 1, more particularly the cutting mechanism 3, extra feeler elements 14 are foreseen in front of said cutting mechanism, which can eventually serve at the same time as crop lifters.

Figure 4:
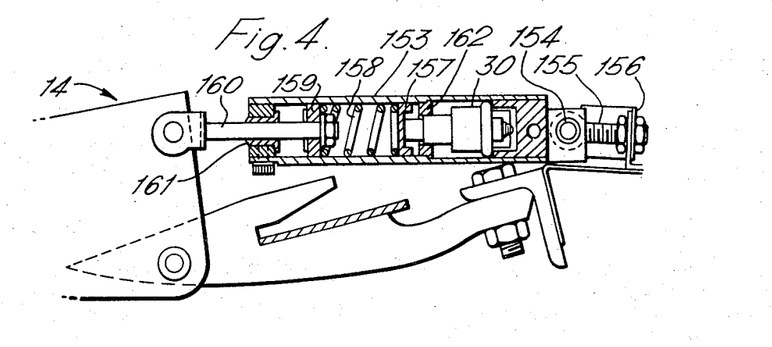
FIG. 4 is a partial section taken along the lines IV—IV of FIG. 2.

In one preferred embodiment, the aforementioned feeler elements 14 may be formed as shown in FIG. 4. Some of the knive guards of the cutting mechanism support a pivotable crop lifter, each of them being pivoted to a rod 160, extending through a seal 161 into a tube 153. Said tube 153 is in turn pivoted to support 156 attached on the header trough via a pivot linkage 154 and rod 155. An electric contact 30 is provided inside said tube 153 and may be actuated by an actuating member 157 upon upwards pivoting movement of the crop lifter. The foregoing displacement is transmitted from the crop lifter to the actuating member 157 by an element 159 fixed to the rod 160 and a spring 158 being provided inbetween said element 159 and said actuating member 157. In order to prevent damage to the electric contact 30, the actuating member 157 cooperates with a stop 162, after the contact 30 has been actuated.

In order to enable a certain setting of the feeler element 14 by which the initial displacement of the element necessary for actuating the contact 30 is adjustable, the fixation of support 156 is made adjustable.

With the foregoing structures, ground sensing members, formed by the crop dividers 5, sensing the ground unevennesses relatively far in front of the header side walls for positioning the header on the one hand, and feeler elements formed by the mechanisms 14, sensing the smaller unevennesses, large stones and other like obstructions, just in front of the cutting mechanism 3 and at regular intervals inbetween both ground sensing members, for safeguarding said cutting mechanism, on the other hand, are provided.

The number of feeler elements 14 is indefinite since they are fixed on the knife guards, but in a practical execution such feeler elements will for example be provided on every fifth to tenth knife guard.

Figure 5:
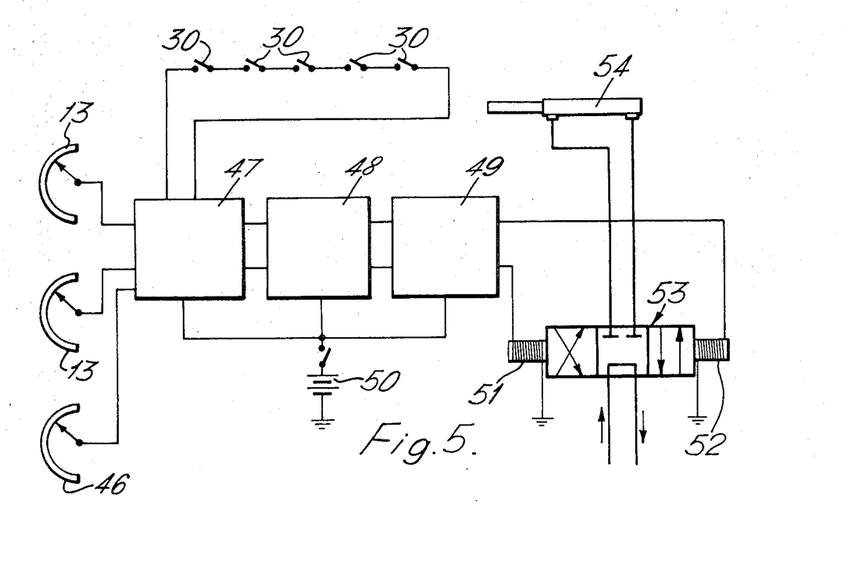
FIG. 5 is a general scheme of the electronic circuit according to one preferred embodiment of the invention.
Figure 6:
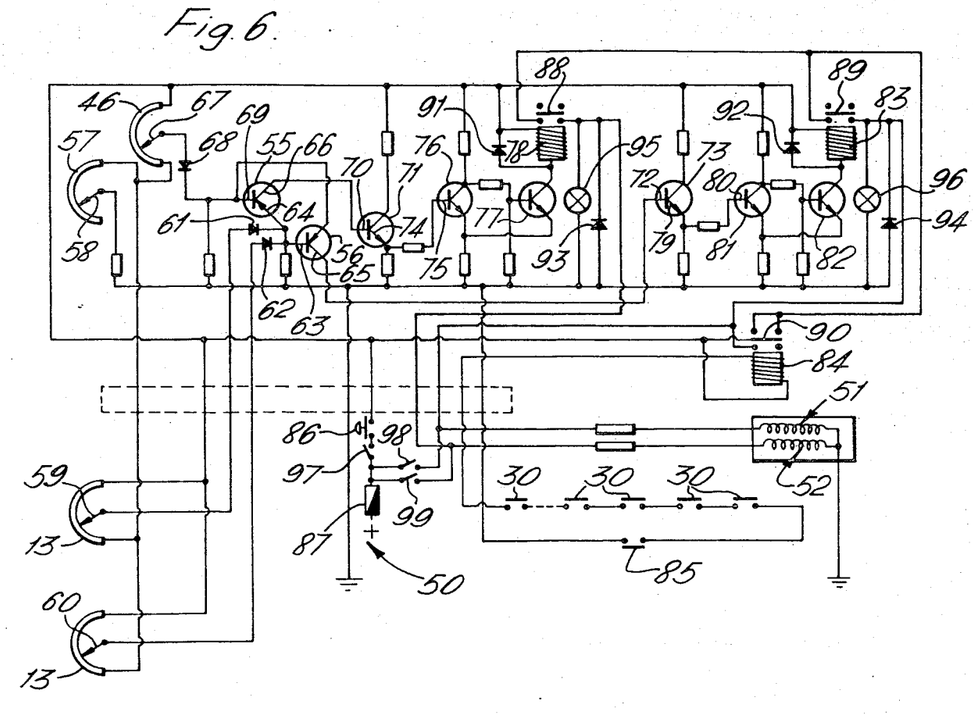
FIG. 6 is a detailed scheme of the electronic circuit according to FIG. 5.

In FIG. 5 a general principle scheme and in FIG. 6 a detailed scheme of an electronic circuit is shown which according to the invention is used for the height adjustment of the header of a combine.

Figure 10:
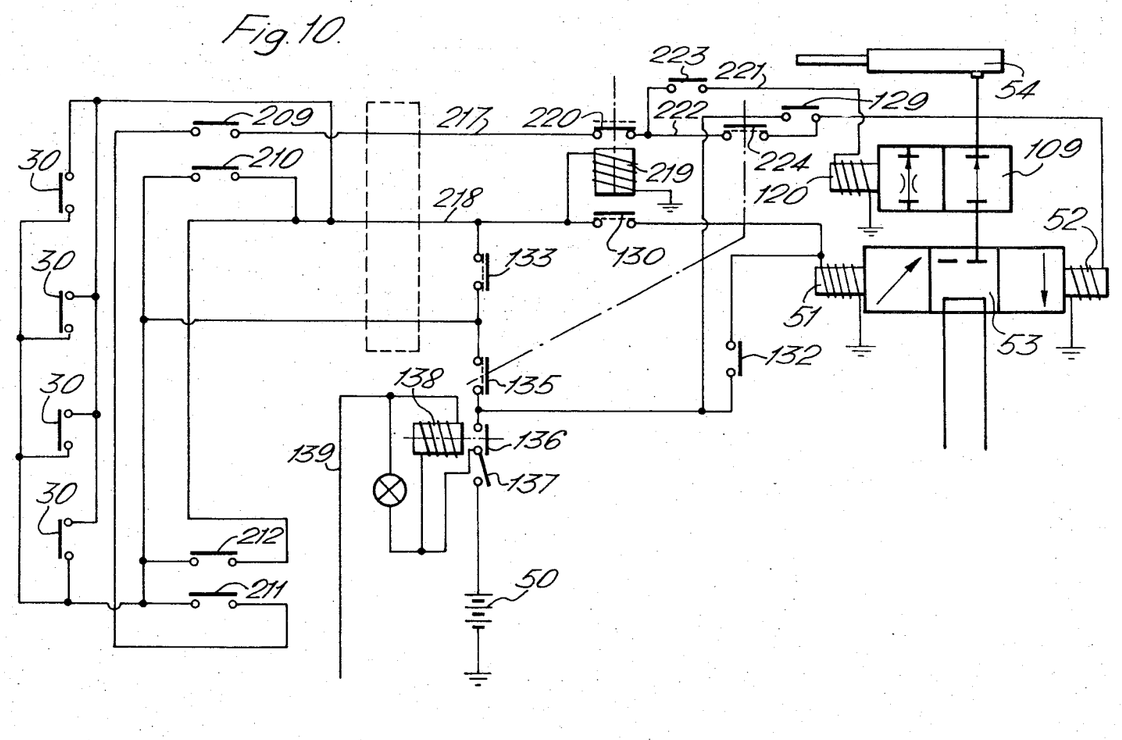
FIG. 10 is a scheme similar to FIG. 6 for an electric circuit corresponding to another alternative embodiment.

In the scheme as shown in FIG. 10 the two position indicators of the crop dividers 5 are indicated with reference 13, while reference 30 indicates the electric contacts of the feeler elements 14. For each feeler element 14 provided between the ground sensing members 5, such a contact 30 is provided. Further, an adjustable third position indicator 46, an amplifier 47 with adjustable dead time, an amplifier 48, a switching mechanism 49, a power source 50 and coils, respectively 51 and 52 of the electro-hydraulic valve 53 which controls the oil supply to and discharge from both header lifting rams 54 are represented.

In FIG. 6 the detailed scheme of the device as shown in FIG. 5 is represented. More especially the electronic part which is a unidirectional conductor circuit is shown. The first stage thereof comprises two transistors, respectively 55 and 56 which are part of the amplifier with adjustable dead time 47.

At one side of the potentiometers 13 and 46 are connected to the positive pole, while at their other side they are connected to the negative pole via a potentiometer 57 and a sliding contact 58.

The brushes or sliding contacts 59–60 of the potentiometers 13 are directly connected via diodes respectively 61 and 62 to the base 63 of transistor 56 and to the emissor 64 of transistor 55. The collectors respectively 65 and 66 of transistors 55 and 56 are each connected with an output circuit. The brush or sliding contact 67 of the potentiometer 46 is connected via a diode 68 to the base 69 of transistor 55 and to the emissor of transistor 56.

The collector 66 of transistor 55 is connected to the base 70 of a transistor 71, whereas collector 65 of transistor 56 is connected to the base 72 of a transistor 73. These transistors 71 and 73 form the aforesaid amplifier 48.

The emissor 74 of transistor 71 is connected via a resistance to the base 75 of a transistor 76 while the latter is connected as well thru the emissor as thru the collector to a transistor 77 of which the collector load is formed by a coil of a relay 78.

The emissor 79 of transistor 73 is connected in a similar way to base 80 of a transistor 81 while the latter is connected as well thru the collector as thru the emissor to a transistor 82 of which the collector load is formed by a coil of a relay 83. The transistors 76–77–81-and 82 form the aforesaid electronic switching mechanism 49.

Furthermore, the electronic circuit also comprises: a third relay 84; the aforesaid coils 51 and 52 of the electro-hydraulic valve 53 the contacts 30 of the crop lifters, connected in series with the aforesaid contacts, a contact 85 which is actuated when the combine is shifted in reverse, a main switch 86 and a fuse 87. The contacts of the relays 78–83 and 84 are respectively indicated by 88–89 and 90.

The circuit described above mainly operates as follows:

By adjusting the potentiometer 46, provided on the instrument pannel at a certain value, the driver of the combine sets the desired stubble height. In case the setting of both potentiometers 13 corresponds with the setting of potentiometer 46, then there is no difference in voltage between the sliding contact 67 on the one hand, and the sliding contacts 59 and 60 on the other hand, so that as well the bases as the emissors of transistors 55 and 56 have the same voltage. At this moment, these transistors are not conducting and the output circuits connected to the collectors 66 and 65 remain desenergized.

However, when one or both crop dividers 5 meets, respectively meet an obstacle, then the setting of one, respectively of both potentiometers 13 will be modified. In other words, when the effective stubble height does not correspond to the desired stubble height, the bases 69 and 63 of transistors 55 and 56 will have different voltages.

The potentiometers 13 are connected in such a manner to the crop dividers that a higher voltage on the brushes 59–60 corresponds with a higher position of the crop dividers with respect to the header or in other words with a lower position of the header with respect to the ground or still in other words with a lower stubble height.

In the event the voltage of one of the contacts 59 and/or 60 is higher than the voltage which was set with the potentiometer 46, which means that the effective stubble height at the location of the aforesaid obstacle is smaller than the desired stubble height, then the voltage at 69 will be lower than at 63 and the aforesaid transistor 55 will become conductive when this difference in voltage exceeds a certain threshold value since the emissor of this transistor is sufficiently positive with respect to its base 69. Consequently at this moment there is a current flow in the output circuit connected to collector 66 while the output circuit connected to collector 65 remains desenergized. Because at this moment an amplified signal is transmitted to transistor 71, also the latter becomes conductive by which the voltage at the base of transistor 76 becomes higher than the voltage at the emissor thereof, so that even this transistor becomes conductive and as a result thereof the transistor 77 is cut off and the solenoid 78 becomes desenergized in the collector circuit of this transistor.

The contacts 88–89 are opened when the relays 78–83 are in an unactuated situation. The contact 90 is placed in its lower position in the unactuated situation of relay 84. Since, as mentioned above, solenoid 78 remains desenergized, the contact 88 remains open. Since the transistor 56 is not conductive when the aforesaid difference in voltage exists the transistors 73 and 81 are also not conductive while transistor 82 is conductive and a current is flowing thru solenoid 83 so that the contact 89 is in the closed position.

Assuming that at this moment, none of the feeler elements 14 encounters an obstacle all the aforesaid contacts 30, are closed which means that the relay 84 is actuated so that the contact 90 is in its top position. From the foregoing it is understood that the circuit, comprising the valve solenoid 51 is energized via contact 89, so that the electro-hydraulic valve 53 is actuated in a suitable manner to lift the header upwards until the setting of the potentiometers 13 corresponds with the setting of potentiometer 46. Indeed, at that moment, transistor 55 becomes again inconductive.

Vice versa, when the voltage of both sliding contacts 59 and 60 becomes smaller than the voltage of the sliding contact 67 of potentiometer 46, in other words, when the smallest stubble height underneath the crop dividers in still larger than the desired stubble height, transistor 56 will become conductive as well as the transistors 73 and 81 by which transistor 82 is cut off. Consequently, there will be no current flow thru the relay 83 by which the contact 89 is opened. Since at this moment the transistor 55 is not conductive, also the transistors 71-76 are not conductive and transistor 77 becomes conductive, whereby a current flows thru solenoid 78, so that the contact 88 is closed. In this way, the circuit comprising solenoid 52 of the electro-hydraulic valve 53 is closed by which the header is moved downwards until the voltages of the potentiometers 13 and 46 again correspond to each other.

In case one or more of the feeler elements 14 comes in contact at a certain moment with an obstacle and at least one switch 30 is opened, the circuit actuating relay 84, will be interrupted so that the contact 90 is moved to its lower position. In this way, the circuits comprising the contacts 88 and 89 are interrupted so that the signals, originating from the crop dividers 5, respectively from the potentiometers 13, can no longer influence the valve solenoids 51 or 52. In this way, one obtains that the adjusting signals, originating from the feeler element 14, have priority to the adjusting signals which originate from the crop dividers 5. Indeed, the switching over of contact 90 to its lower position results in an energization of solenoid 51 so that the valve 53 is actuated in such a manner that the header is raised. This lifting lasts until the respective contact 30 is closed again, by which the adjusting signals of the crop dividers can again influence the valve 53.

In order to obtain a stable system, this means that the adjusting operation stops before one of the signal detectors requires a new opposite correction, transistors 55 and 56 will be chosen and be adjusted as such that the threshold value thereof is just large enough. In case it would be too small, the mechanism would have a tendencay to overcompensate which would result in useless displacements of the header. Consequently it is necessary that there is a certain dead time present in the system.

This dead time can also be made adjustable by means of the potentiometer 57 whereby the voltage over the potentiometers 46 and 13 is adjustable and whereby the voltage per unit of angular displacement of these potentiometers is also adjustable. In other words the minimum angular displacement of the crop divider needed for obtaining a difference in voltage over the transistors 56–55 which exceeds the threshold value, is adjustable.

The diodes 61–62 and 68 prevent that current would flow from the transistors to the potentiometers. At the same time, the diodes 61–62 prevent any short circuiting between the potentiometers 13, being in parallel. This arrangement in parallel is necessary so that the voltage on the base 63 of the transistor 56 would always be the highest of the voltages measured in the potentiometers 13, since the highest potential corresponds with the highest postion of a crop divider, in other words, the crop divider which senses the highest obstacle. The diodes 91 and 92 serve as protection for the transistors 77 and 82 against the induction voltages which are enduced by the switching off of the solenoid 78, respectively 83, while the diodes 93 and 94 have the same function with respect to the solenoids 51 and 52.

Furthermore, lamps 95 and 96 are provided on the control pannel and which allows to check whether the header is adjusted in height.

The aforesaid switch 85 is normally closed and is only opened when the combine is shifted in reverse by which the header will lift. This lifting lasts until the header is in the position by which a switch 97 is opened which entirely desenergizes the electronic circuit. The switch 86 is the main switch with which the device can manually be switched on and off and the switches 98 and 99 are normally open and allow the driver of the combine to control the header lifting mechanism manually. The switches 98 and 99 are preferably connected in one or another way with the main switch so that during actuation of the switches 98 and 99 the electronic circuit is cut off.

Figure 7:
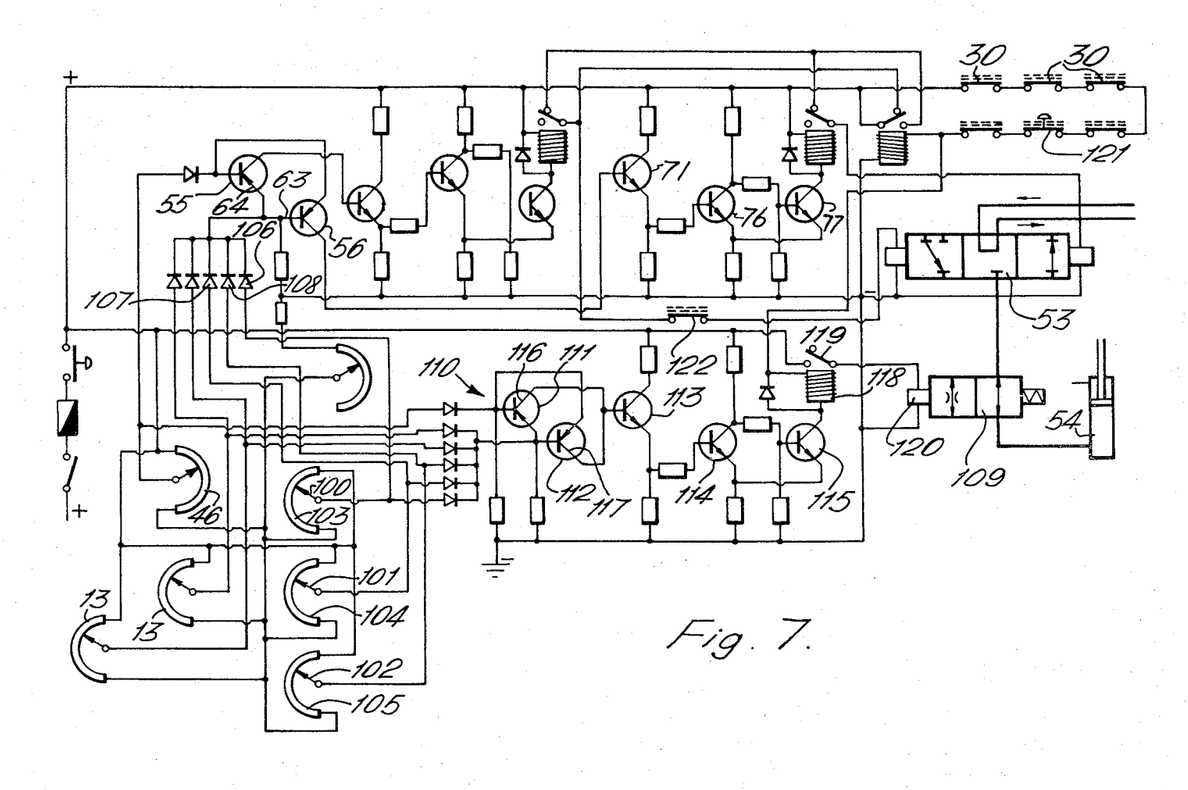
FIG. 7 is a detailed scheme of the electronic circuit of an alternative preferred embodiment.

In FIG. 7 the electronic scheme of a further developped execution is shown. In addition to the ground sensing members 5 already described above and extending in front of the header, other ground sensing members being coupled to similar position indicators 103–104–105, etc., may be provided underneath the header trough, whereby such ground sensing members form an additional safety device for making the header float over the ground. These additional ground sensing members have proven to be practical especially in those exceptional circumstances where the feeler elements 14 cannot be used such as, e.g., laid on down crops with much green material.

The additional position indicators 103–104–105 are connected in parallel with the position indicators 13 of the crop dividers, so that at any time the signal requiring the highest position has priority to any other signal. Therefore also each brush or sliding contact 100–101–02 of the additional potentiometers 103–104–05 is connected to the transistors 55–56 via diodes 106–107–108.

All the further components shown in FIG. 7 which are similar to those described with respect to FIG. 6 will not again be described in detail.

Further, a throttling valve 109 is provided in the hydraulic circuit of the header lifting rams 54 for, when effective, to slow down the movement of the header. The throttling valve 109 is controlled electrically via a coil 120, whereby on actuation of this coil the valve 109 is placed in its throttling position. When only small height corrections have to be made this valve is placed in its aforesaid throttling position, so that the header is only moving slowly. When the header corrections to be made are considerably large, the throttling valve is brought in its non-effective position during a certain portion of the correction, so as to reduce the correction time to its minimum value, while at the end of the correction movement, the throttle valve 109 is again placed in its effective position, so as to prevent any too sudden change in the movement, which otherwise finally would result in an unstability of the automatic height control mechanism.

In order to control the position of the throttle valve 109, an additional electronic circuit 100 is provided in parallel with the main circuit as shown in FIG. 6. The additional circuit 110 is very similar to one half of the main circuit mainly comprising the transistors 55,56,71,76 and 77 and comprises itself transistors 111,112,113,114 and 115. The major differences reside in the fact that both collectors 116 and 117 of the transistors are connected to the base of transistor 113 and in that the threshold value of the transistors 111 and 112 is much higher than the threshold value of transistors 55 and 56. The latter fact ensures that circuit 110 only becomes conductive when the correction signal of at least one of the ground sensing members 13,103,104,105 is relatively large. The inputs of circuit 110 are also formed by on the one hand the position indicators 13, 103, 104, 105 and on the other hand the adjustable position indicator 46.

The operation of circuit 110 is very similar to the operation of the main circuit. When the ground sensing members detect a major unevenness in the ground, one of the transistors 111-112 becomes conductive, whereby transistor 115 is cut off and relay 118 is desenergized. As a result thereof contact 119 is opened and coil 120 is also desenergized, whereby the valve 109 is in its non-effective position. At this moment the correction of the header height is made quickly as there is no throttling in the oil supply to, respectively from the header lifting rams.

When the correcting signal detected by the ground sensing members is small, or was first large and became smaller by an initial fast correction of the header height, the transistors 111–112 become both inconductive, even when still one of the transistors 55–56 remains conductive, whereby finally the coil 118 is energized and contact 119 closed. This results in an energization of coil 120 of the throttle valve 109, whereby said valve becomes effective and the oil supply to, respectively from the header lifting rams is throttled.

When at least one of the contacts 30 of the feeler elements 14 is opened, the power circuit of coil 118 is also interrupted, so that also at this moment contact 119 is opened and the coil 120 of valve 109 is desenergized. It is thus understood that, when a stone, or other obstacle is only detected by a feeler element just in front of the cutter bar, a quick adjustment which is then desirable, is obtained.

The circuit of the contacts 30 comprises in series another contact 121, which is a two position switch which can be actuated by the operator and which is very practical when the combine is moving out of a strip of crops for turning on the headlands and to start harvesting another strip of crops. When mowing out of a strip of crops, the operator opens contact 121, whereby the header is raised quickly for the same reasons as described above with respect to the opening of one of the contacts 30. This raising lasts until the header reaches a transport position, whereby another contact 122, provided in the power circuit of the coil 51 of valve 53 is opened and thus valve 53 is brought in its neutral position. Before starting harvesting another strip of crops, the operator brings the contact 121 in its other, closed position whereby the automatic system again gets priority and the header is thus lowered until is reaches its desired position set with potentiometer 46 and whereby contact 122 is again closed.

Figure 8:
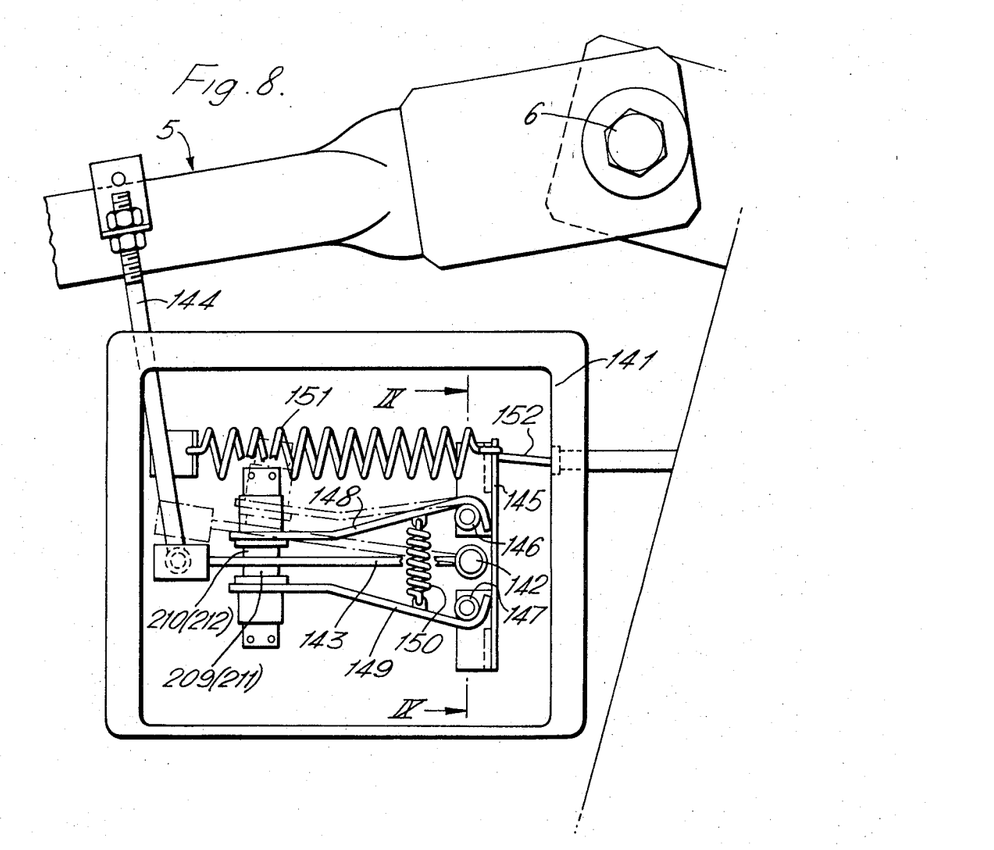
FIG. 8 shows on a larger scale an alternative preferred embodiment of the part shown in FIG. 3.
Figure 9:
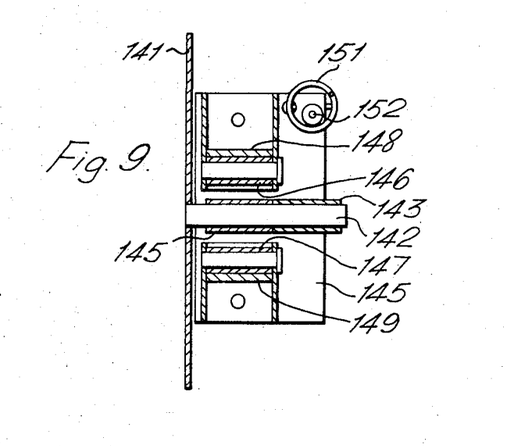
FIG. 9 is a sectional view taken along the lines IX—IX of FIG. 8.

In a further alternative preferred embodiment as shown in FIGS. 8–9 and 10, each crop divider may actuate a position indicator comprising two electric contacts 209,120, respectively 211,212, which are fixed on supports 149,148. The contacts 209,210 respectively 211, 121 may be actuated by means of a rod 143 pivotally supported on shaft 142 at one free end thereof and at its other free end also pivotally connected to another rod 144, which in turn is pivoted to the crop lifter 5. The supports 148,149 are pivoted around shafts 146 and 147 and are urged to each other by a spring 150, while a free end of each support 148,149 may abut against member 145. The shafts 146,147 are provided on member 145 which in turn may also be pivoted around shaft 142, being fixed to the inner wall of box 141. The position of member 145 may be obtained by means of an adjusting Bowden cable extending, e.g., to the steering platform on the one hand and a spring 151 on the other hand.

Inbetween the crop dividers, again feeler elements 14 are provided which may actuate contacts 30, which in this embodiment are normally open, and become closed on actuation by the respective element 14.

FIG. 10 shows the electric scheme of the alternative preferred embodiment which will be described hereafter. The contact 210 of one position indicator and contact 212 of the other position indicator are connected in parallel, so that only one contact has to be closed to actuate the output circuit 218. The other contacts 209 and 211 of both position indicators are connected in series with each other so that the output circuit 217 thereof is only actuated when both contacts are closed. The former contacts 210 and 212 control the raising of the header while the latter contacts 209,211 control the lowering. Also the contacts 30 are coupled in parallel with the contacts 210 and 212 to output circuit 218. Further a relay 219 is provided in circuit 218 which co-operates with a switch 220 in circuit 217 in such a manner that, when relay 219 is energized switch 220 is opened and when relay 219 is desenergized the latter is closed.

Further circuit 217 comprises two branches behind the switch 220. The first branch 221 comprises a switch 223 which is normally open and is only closed when the header reaches below a certain level. Further branch 221 forms the power circuit of coil 120 of a throttle valve 109 as described above. The other branch comprises a switch 224, which during operation is always closed and forms the power circuit of coil 52 of the electro-hydraulic valve 53 as described above.

The contacts 209 and 211 together with the switches 220 and 224 are by-passed by switch 129, which may be actuated manually for energizing coil 52 independant from the signals received from contacts 209-211.

Circuit 218 further comprises an end switch 130 which is opened by the header when the latter is brought to its highest position, which is normally the transport position. Circuit 218 further comprises coil 51 of the valve 51. All contacts provided in circuit 218 are by-passed by switch 132 which also may be actuated manually for energizing the coil 51 of valve 53. The contacts 30, 210 and 212 are by-passed by switch 133, which is a two position switch similar to contact 121 described above.

The main contact of the automatic header height control is indicated with 135, and is mechanically coupled to switch 224 so as to ensure that both are closed and opend simultaneously. Safety contact 136 is only closed when the engine of the combine is turning. At this moment engine contact 137 is closed and the difference in voltage between battery 50 on the one hand and the alternator and voltage regulator to which 139 is connected is relatively small, so that relay 138 is desenergized. The safety contact 137 is closed when the relay is desenergized so that the electric circuit of the header height control is cut off when the engine contact is on, while the engine is not turning. (as at that moment the aforementioned difference in voltage is considerable). The safety device as described above prevents any displacement of the header when the engine contact would be on while the engine is not turning. Such a situation may occur during servicing and thus an undesirable actuation of the electric circuit might otherwise make the header to be moved and eventually cause an accident.

The alternative preferred embodiment as described above operates as follows:

When, e.g., one of the crop dividers, respectively feeler elements 14 detects an obstacle, the respective contact 210, respectively 212 or 30 is closed whereby relay 219 becomes energized and switch 220 is opened, so that contacts 209 and 211 cannot interfere in the adjustment. As switch 130 is normally closed, coil 51 is energized and this results in a raising of the header. Such raising takes place as long as not all the contacts 210, 212 and 30 are opened again.

When contacts 209 and 211 are actuated simultaneously, while none of the contacts 210, 212 and 30 are actuated, this means that the header is positioned too high and should be lowered. Relay 219 is disenergized and switch 220 is closed. A current is flowing thru circuit 217 whereby coil 52 is energized and the header is lowered (the switch 224 is closed when the main switch 135 is on). At this moment the throttle valve is in its non-operative position. Once the header reaches below a certain level, by which the contact 223 becomes closed, also the coil 120 of the throttle valve 109 is energized and the latter is shifted to its throttling position. The further lowering of the header is much more slowly, due to the throttling action of valve 109, which is advantageous as thereby the automatic height control mechanism is made much more stable, for the same reasons as described above. This lowering of the header lasts as long as both contacts remain closed or until one of the contacts 30, 210 and 212, giving a raising signal become closed.

The two position switch 133 by-passes the circuit in which the raising signals originate. When the switch 133 is brought in its closed position, the header is raised until switch 130 is opened by the latter. This only happens when the header reaches its maximum height, which is normally the transport position. As long as switch 133 is kept in this position, the relay is energized and no signals requiring a lowering can become effective. Once the switch is brought in its other (open) position, relay 219 is desenergized and the automatic height control system gets again priority. This switch is especially practical when used while maneuvering the combine on the headlands as described above. Therefore the switch 133 will preferably be made as a foot actuatable switch provided on the steering platform in the neighborhood of the operator's seat.

Switches 129 and 132 enable a manual intervention of the operator for positioning the header and are especially practical when the main switch 135 is switched off. At this moment the switches 129 and 132 enable a manual adjustment of the header height. Switch 224, being coupled mechanically to the main switch 135 prevents that, as otherwise would happen when the main switch is off, the electric header height controlling circuit would become energized upon actuation of the manually controllable switch 129.

The desired height level of the header is settable by pivoting member 145 around shaft 142. This may be obtained by using the adjustable Bowden cable 152 and the influence of spring 151. Another position of the contacts 209–210, respectively 211–212, corresponding to another height level is indicated in dotted lines on FIG. 8. It should especially be remarked that all contacts are arranged in such a manner with respect to each other, that any signal requiring a raising of the header gets priority to any other signal.

The above described preferred embodiments provide an automatic header height control mechanism which incorporates all the advantages as described in the Summary of the Invention and eliminates all the disadvantages of the prior art, of which some are also mentioned above, and which enables a completely safe and adequate operation of the combine, without the operator having to continuously control and adjust the header height manually.

MODIFICATIONS

Other features and advantages of the present invention will occur to those skilled in the art, as will many modifications and alterations in the preferred embodiments of the invention described herein, all of which may be achieved without departure from the spirit and scope of the invention.

It will for instance be understood that the same good results may be obtained with an execution wherein the coils of the hydro-electric valve 53 and the throttle valve 109 are replaced by an electric motor, which controls the position of the valve 53, responsive to the magnitude of the signals supplied to the inputs of said motor, so as to control the direction and the speed of the header height correction.

Further it is also obvious that the aforesaid relays 78–83 and 84 could eventually be replaced by switching transistors. It is also obvious that the aforesaid mechano-electric transducers, particularly the potentiometers can be replaced by capacitive, inductive or piezo-electrical elements which eventually give similar output signals in combination with other electrical contacts.

What is claimed is:

1. An automatic header height controlling mechanism for a header of an agricultural machine, such as harvesters of the type having a header with a cutting mechanism for cutting the crops, mounted on the harvester for vertical swinging movement relative to the ground, said automatic header height controlling mechanism comprising electrical position indicator means, ground sensing members coupled to the side edges of said header and to said electrical position indicators means and extending far in front of the header; a series of feeler elements provided on the header rearwardly of and inbetween said ground sensing members; a fluid pressure operated header lifting unit interconnecting the header and the harvester for adjusting vertically the position of said header; a header lifting unit controlling means controlling the fluid supply to and discharge from said unit; and an electric servo circuit coupling said controlling means to the electrical position indicator means for forming a header positioning circuit for generally positioning the header respective to the ground contours sensed by the ground sensing members on the one hand and to the feeler elements for on contact thereof with an obstacle located inbetween the ground sensing members to raise the header, independent from the header positioning circuit on the other hand.

2. In combination with the header of an agricultural machine such as a harvester of the type having a header mounted on the harvester for vertical swinging movement relative to the ground, said header having a cutting mechanism for cutting the crops, the combination therewith of an automatic header height controlling mechanism, comprising electrical position indicator means, ground sensing members coupled to the side edges of said header and to said electrical position indicator means and extending far in front of the header, a series of feeler elements provided on the header rearwardly of and inbetween said ground sensing members, a fluid pressure operated header lifting unit interconnecting the header and the harvester for adjusting vertically the position of said header; a header lifting unit controlling means controlling the fluid supply to and discharge from said unit, and an electric servo circuit coupling said controlling means to the electrical position indicator means for forming a header positioning circuit for generally positioning the header respective to the ground contours sensed by the ground sensing members on the one hand and to the feeler elements for on contact thereof with an obstacle located inbetween the ground sensing members to raise the header, independant from the header positioning circuit on the other hand.

3. In an agricultural machine such as a harvester having a main body with a header mounted thereon for vertical movement and a fluid pressure operated header lifting unit for raising and lowering the header relative to the ground, an automatic header height controlling mechanism for controlling said header lifting unit in accordance with the contour of the ground comprising : electrical position indicator means, ground sensing members coupled to the side edges of said header and to said electrical position indicator means and extending far in front of the header, a series of feeler elements provided on the header rearwardly of and inbetween said ground sensing members; a header lifting unit controlling means controlling the fluid supply to and discharge from said unit and an electric servo circuit connected to said position indicator means and to said feeler elements on the one hand and to the header lifting unit controlling means on the other hand for during operation to actuate the header lifting unit controlling means to raise and lower the header in accordance with the ground contour as detected by the position of the higher of the ground sensing members and of the feeler elements.

4. The combination of claim 1 wherein the ground sensing members are crop dividers being pivoted to the side walls of the header for vertical swinging movement relative to the ground contour at a location relatively far in front of the header on forward operative travel of the harvester in the field.

5. The combination of claim 1 wherein said ground sensing members are pivoted to the header and wherein each electrical position indicator means is an electric element being coupled to each of said ground sensing members for on vertical swinging movement of the ground sensing members respective to the ground contour, to have a varying electric output characteristic.

6. The combination of claim 3 wherein the ground sensing members are crop dividers being pivoted to the side walls of the header for vertical swinging movement relative to the ground contour at a location relatively far in front of the header on forward operative travel of the harvester in the field, and wherein the position indicator means are potentiometers having a sliding contact being coupled to said crop dividers for on said vertical swinging movement of the crop dividers to have a varying electric output characteristic.

7. The combination of claim 1 wherein the aforesaid feeler elements are crop lifter-shaped sensing means provided to the header in front of the cutting mechanism and inbetween the ground sensing members, and wherein a series of electrical contacts is provided in the electric circuit, and of which each contact thereof may be actuated by a corresponding crop lifter shaped sensing means on contact of the latter with an obstacle which results in a vertical swinging movement of said sensing means.

8. The combination of claim 7 wherein the aforesaid electrical contacts are normally closed contacts being placed in series, which upon vertical swinging movement of said sensing means are opened.

9. The combination of claim 8 comprising additional contacts in series with said first electrical contacts for upon actuation by the operator to raise the header.

10. The combination of claim 5 wherein the electric circuit comprises an additional adjustable electric element having a variable electric output characteristic corresponding to the desired header height for upon setting of said additional electric element to have the electric circuit actuated said header lifting unit controlling means to raise and lower the header corresponding to the differences between the electric characteristics of the first electric elements and the additional element and to continuously tend to eliminate this difference.

11. The combination of claim 1 wherein the electric circuit is a symmetrical semi-conductor switching circuit which switches the header lifting unit controlling means respective to the ground contour sensed by said ground sensing means.

12. In an agricultural machine such as a harvester having a main body with a header mounted thereon for vertical movement and a fluid pressure operated header lifting unit for raising and lowering the header relative to the ground, an automatic header height controlling mechanism for controlling said header lifting unit in accordance with the contour of the ground, comprising : crop divider means pivoted to the header and extending far in front of the header for sensing the ground contour; first electrical elements coupled to said crop divider means having variable electrical output characteristics in accordance to the ground contour sensed by said crop divider means; a second electrical element having an adjustable electric output characteristic for setting the desired header height; a header lifting unit controlling means coupled to the header lifting unit for controlling the fluid supply to and discharge from said unit and a symmetrical semiconductor servo-circuit coupled to the header lifting unit controlling means and having a first and a second input being connected respectively to the first electrical elements and the second electric element for during operation to actuate the header lifting unit controlling means to raise and to lower the header in accordance with the difference between the electrical characteristics of the first and the second electrical elements and to continuously tend to eliminate this difference.

13. The combination of claim 1 wherein the electric servo-circuit comprises at least one relay for actuating the header lifting unit controlling means in one or the direction to raise and lower the header correspondingly.

14. The combination of claim 1 wherein the electric servo-circuit comprises a first relay coupled to the feeler elements, for on displacement of at least one of the latter to directly actuate said header lifting unit controlling means to raise the header, and at least one other relay coupled to the position indicator means for when the feeler elements are in their neutral position to actuate said controlling means in one or the other direction to raise and lower the header responsive to the displacement of the indicator means.

15. In an agricultural machine such as a harvester having a main body with a header mounted thereon for vertical movement and a fluid pressure operated header lifting unit for raising and lowering the header relative to the ground, an automatic header height controlling mechanism for controlling said header lifting unit in accordance with the contour of the ground comprising ground sensing members pivoted to the side edges of the header and extending far in front of the header, a header lifting unit controlling means for controlling the header lifting unit, an electric servo-circuit interconnecting said ground sensing members and said controlling means for forming a header positioning circuit for positioning the header relative to the ground contour, feeler elements pivoted to the header rearwardly of and inbetween the ground sensing members, electric contacts actuable by said feeler elements and being connected in series with each other; a relay having its actuation coil in series with said contacts, the contacts of said relay controlling the power supply to said controlling means for upon actuation of at least one feeler element to directly energize the controlling means to raise the header and for when the feeler elements are in neutral position to have said controlling means connected to said positioning circuit for positioning the header relative to the ground contour detected at the location of the ground sensing members.

16. The combination of claim 12 wherein the symmetrical semi-conductor servo-circuit comprises a discriminator state having at least two transistors, two inputs and two output circuits, the inputs being connected to the first and second electrical elements and each output circuit comprising a semi-conductor amplifier, a semi-conductor Schmittriger circuit and a relay coupled to said Schmittriger circuit for responsive to the difference between the electrical characteristics of the first and second electrical elements, to energize one or the other output circuit and to energize one or the other relay for raising or lowering the header correspondingly.

17. The combination of claim 16 wherein the first electrical elements are coupled in parallel to the first input of the discriminator circuit.

18. The combination of claim 1 wherein the automatic header height controlling mechanism further comprises a throttling valve in the header lifting unit controlling means which on actuation becomes operative for throttling the fluid supply to and discharge from the fluid pressure operated header lifting unit, and an additional electric circuit interconnecting said position indicator means and said throttling valve for actuating said valve when the condition of movement of the header is changed.

19. The combination of claim 12 wherein the automatic header height controlling mechanism further comprises a throttle valve in the header lifting unit controlling means which on actuation becomes operative for throttling the fluid supply to and discharge from the fluid pressure operated header lifting unit; and an additional electric circuit having a first stage with two inputs and an output circuit, the first and second input being coupled to the first and second electrical elements, the output circuit having a semi-conductor amplifier, a Schmittriger circuit and a relay of which the switching circuit controls said throttle valve for during operation to control the position of said valve respective to the magnitude of the difference between the electrical characteristics of said first and second electrical elements.

20. The combination of claim 19 wherein the solenoid circuit of said relay comprises contacts which upon actuation of at least one thereof prevents the throttling valve from shifting to its operative position.

21. In an agricultural machine such as a harvester having a main body with a header mounted thereon for vertical movement and a fluid pressure operated header lifting unit for raising and lowering the header relative to the ground, an automatic header height controlling mechanism for controlling said header lifting unit in accordance with the ground contour comprising : ground sensing members pivoted to the header side walls and extending far in front of the header, first electric elements actuable by said ground sensing members, upon angular displacement thereof respective to the ground contour, feeler elements pivoted to the header rearwardly of and inbetween said ground sensing members, second electric elements actuable by said feeler elements, a header lifting unit controlling mechanism for controlling the fluid supply to and discharge from said header lifting unit, an electric circuit interconnecting said controlling mechanism and said first electric elements for forming a header positioning circuit to raise and lower the header respective to the ground contour sensed by said ground sensing members on the one hand, and to the second electric elements for upon actuation of at least one of the latter elements to raise the header; and a relay in said electric circuit for giving priority to any upward height adjustment.

22. The combination of claim 21 wherein the first electrical elements each comprise a first contact which is actuated by an upward swinging movement and a second contact which is actuated by a downward swinging movement of the respective ground sensing member wherein the first contacts of all first electrical elements are coupled in parallel in a circuit further having the solenoid of said relay; and the second contacts of all first electrical elements are coupled in series in the switching circuit of said relay; said header lifting unit controlling means being coupled to said first circuit in parallel relation to said solenoid and to said second circuit, for upon actuation of at least one of said first contacts to open said switching circuit and to raise the header and for upon actuation of all the second contacts to close the switching circuit and to lower the header.

23. The combination of claim 21 wherein the first electrical elements each comprise a first contact which is actuated by an upward swinging movement and a second contact which is actuated by a downward swinging movement of the respective ground sensing member, wherein the second electrical elements are third contacts actuable upon upward swinging movement of said feeler elements, wherein the first and third contacts are coupled in parallel in a circuit also being coupled to the solenoid of said relay; and the second contacts are coupled in series in the switching circuit of said relay; said header lifting unit controlling means being connected to said first circuit in parallel relation to said solenoid and to said second circuit, for upon actuation of at least one of said first and third contacts to open said switching circuit, to raise the header and to exclude any influence from said second circuit, and for upon actuation of all contacts of said second circuit and when all other contacts are not actuated to close the switching circuit and to lower the header.

24. The combination of claim 23 wherein a throttle valve is provided in the header lifting unit controlling means for when in its operative position to throttle the fluid supply to and discharge from said header lifting unit and wherein a throttle valve controlling circuit is connected to said second circuit in parallel relation to the interconnection between said second circuit and said controlling means and having a contact being closed only when the header reaches below an adjustable level, for upon downward movement of the header below said level to shift the throttling valve in its operative position.

25. The combination of claim 23 wherein a two position contact is provided in parallel to said first and third contacts and an end contact breaker is coupled in series in said first circuit for upon actuation of said two position contact by the operator to raise the header until said end contact breaker is actuated.

* * * * *